(12) United States Patent
Beck et al.

(10) Patent No.: US 8,382,634 B2
(45) Date of Patent: Feb. 26, 2013

(54) MULTISTAGE TRANSMISSION

(75) Inventors: Stefan Beck, Eriskirch (DE); Gerhard Gumpoltsberger, Friedrichshafen (DE); Hans-Peter Freudenreich, Griesingen (DE)

(73) Assignee: ZF Friedrichshafen, AG, Friedrichshafen (DE)

( * ) Notice: Subject to any disclaimer, the term of this patent is extended or adjusted under 35 U.S.C. 154(b) by 62 days.

(21) Appl. No.: 13/213,502

(22) Filed: Aug. 19, 2011

(65) Prior Publication Data

US 2012/0053008 A1 Mar. 1, 2012

(30) Foreign Application Priority Data

Aug. 27, 2010 (DE) .......................... 10 2010 039 865

(51) Int. Cl.
*F16H 3/44* (2006.01)
(52) U.S. Cl. .......................... 475/282; 475/279; 475/290
(58) Field of Classification Search .................. 475/269, 475/275, 279, 282, 290
See application file for complete search history.

(56) References Cited

U.S. PATENT DOCUMENTS

| 7,727,103 | B2 * | 6/2010 | Seo ............................... 475/275 |
| 2009/0209389 | A1 | 8/2009 | Phillips et al. |
| 2010/0210400 | A1 * | 8/2010 | Phillips et al. ................. 475/275 |
| 2012/0053005 | A1 * | 3/2012 | Beck et al. ..................... 475/275 |

OTHER PUBLICATIONS

Gumpoltsberger, G.: "Systematic Synthesis and Evaluation of Multi-stage Planetary Transmissions", Dissertaion TU Chemntiz, Aug. 7, 2007 Auszuge markiert.
Gumpoltsberger, G.: "Synthesis of Planetary Transmission", Planetary Transmissions WS 2010/2011.

* cited by examiner

*Primary Examiner* — David D Le
*Assistant Examiner* — Stacey Fluhart
(74) *Attorney, Agent, or Firm* — Davis & Bujold, PLLC (57) ABSTRACT

A multi-stage transmission (1) having a housing (9), a drive shaft (AN), an output shaft (AB), four planetary gear sets (RS1, RS2, RS3, RS4) each having first, second and third elements, at least eight rotatable shafts (1, 2, 3, 4, 5, 6, 7, 8) and six shift elements comprising four clutches (K1, K2, K3, K4) and two brakes (B1, B2). Selective engagement of the clutches and brakes results in different transmission ratios between the drive shaft (AN) and the output shaft (AB) so that up to nine forward gears can be implemented. The multi-stage transmission is delimited by the connections of the individual elements to each other and exactly three of the six shift elements are engaged for each of the up to nine forward gears.

13 Claims, 3 Drawing Sheets

| gear | engaged shifting elements ||||||  ratio i | step φ |
|---|---|---|---|---|---|---|---|---|
| | brake || clutch ||||||
| | B1 | B2 | K1 | K2 | K3 | K4 | | |
| 1 | X | | | X | X | | 3.667 | 1.377 |
| 2 | X | | X | | X | | 2.664 | 1.236 |
| 3 | X | | | | X | X | 2.155 | 1.262 |
| 4 | | | X | | X | X | 1.708 | 1.240 |
| 5 | | | | X | X | X | 1.377 | 1.133 |
| 6 | | X | | | X | X | 1.215 | 1.210 |
| 7 | | X | X | | X | | 1.004 | 1.235 |
| 8 | | X | X | X | | | 0.813 | 1.241 |
| 9 | | X | X | | | X | 0.655 | TOTAL 5.600 |

Fig. 5

MULTISTAGE TRANSMISSION

This application claims priority from German patent application serial no. 10 2010 039 865.9 filed Aug. 27, 2010.

FIELD OF THE INVENTION

The present invention relates to a multi-stage transmission of a planetary design.

BACKGROUND OF THE INVENTION

According to the prior art, multi-stage transmissions of a planetary design comprise planetary gear sets that are shifted using friction elements or shift elements such as clutches and brakes, and typically are connected to a start-up element, such as a hydrodynamic torque converter or a fluid coupling, that is subject to a slip effect and is provided optionally with a lock-up clutch. Such multi-stage transmissions are already generally described numerous times in the prior art, particularly for use as a motor vehicle transmission. The dissertation entitled "Systematic Synthesis and Evaluation of Multi-stage Planetary Transmissions" by Gerhard Gumpoltsberger in 2007 presented to the mechanical engineering faculty at the Technical University of Chemnitz discusses such multi-stage transmissions.

Such transmissions should have a sufficient number of gear steps and a transmission ratio that is well suited to the specific application by having a high overall gear ratio spread and favorable step changes. In addition, these transmissions should have a relatively simple design, in particular requiring a low number of shift elements, and minimize the need for double shifting when sequential shifting is performed, thereby ensuring that in each case only one shift element is switched when shifting is performed in defined groups of gears.

For other applications, such advantages are also desirable, where depending upon the application, certain aspects have a particularly high priority. Applications are known in which the weight and the construction size are a deciding factor. For instance, in the drive train of large-volume, high-pressure pumps, in the case of so-called "frac pumps" that are used to extract underground energy sources in a fracturing process, high value is placed on low weight and a small constructions size of an appropriate transmission between the drive motor and the pump, because such pumps should be as easy to transport as possible. At the same time, such transmissions must cover a necessary range of rotational speeds with the lowest possible step changes between the individual gears in order to be able to achieve a desired torque progression with as few gaps as possible. This allows the pump to be set to any desired volume flow within a prescribed volume flow range. In so doing, torques of over ten thousand Newton meters must be transmitted from the multi-stage transmission.

SUMMARY OF THE INVENTION

The problem addressed by the present invention is that of creating a multi-stage transmission of a planetary design having a large number of gear steps, a high overall gear ratio spread and favorable step changes, the lowest possible weight and dimensions that are as compact as possible, with the lowest possible manufacturing expenditure.

The multi-stage transmission according to the invention comprises a housing, a drive shaft, an output shaft, four planetary gear sets each having a first, second and a third element, at least eight rotatable shafts, six shift elements, composed of four clutches and two brakes, where the selective engagement of the clutches and brakes produces different transmission ratios between the drive shaft and output shaft thereby enabling up to nine forward gears. In so doing, the drive shaft forms a part of the first shaft and can be constantly connected in a rotationally fixed manner to the third element of the first planetary gear set. The first element of the first planetary gear set is constantly connected in a rotationally fixed manner to the housing. The second element of the first planetary gear set forms a part of the fifth shaft and can be connected via the third clutch to the second element of the second planetary gear set. The first element of the second planetary gear set forms a part of the fourth shaft and can be connected to the housing via the second brake. The third element of the second planetary gear set forms a part of the third shaft and can be connected to the housing via the first brake. The third element of the second planetary gear set is also constantly connected in a rotationally fixed manner to the third element of the fourth planetary gear set via the third shaft. The first element of the fourth planetary gear set forms a part of the seventh shaft and can be connected in a rotationally fixed manner to the first shaft via the first clutch, where the first shaft is simultaneously the drive shaft. The second element of the fourth planetary gear set comprises a part of the second shaft and is constantly connected in a rotationally fixed manner to the output shaft. Exactly three of the six shift elements are torque-transmitting in each gear step.

Torque-transmitting means that the relevant shift element is engaged at least so far that torque can be transmitted via this shift element. This applies for a fully engaged brake or clutch, just as it does for a partially engaged dragging brake or clutch.

The design of the multi-stage transmission according to the invention results in advantageous transmission ratios and a high overall gear ratio spread, particularly for large-volume, high-pressure pumps, whereby a broad transmission ratio range can be covered, thereby enabling a large rotational speed range to be attained at the pump. Furthermore, due to the small number of shift elements, construction complexity is minimal, and the weight of the multi-stage transmission as well as the production costs are low.

Furthermore, the multi-stage transmission according to the invention yields good efficiency as a consequence of low drag losses and gearing losses.

A further advantage is that low torques are present in the shift elements and in the planetary gear sets, whereby wear in the multi-stage transmission is reduced in an advantageous manner, thereby permitting the components to have correspondingly small dimensions. The overall construction space required for the multi-stage transmission and the drive train are therefore also reduced. Furthermore, the transmission according to the invention has low absolute and relative rotational speeds at the shafts, the shift elements and the elements of the planetary gear set.

The transmission according to the invention is designed to be adaptable to different constraints, in particular with respect to spatial constraints. Thus, it is possible for example, along with the preferred coaxial arrangement of the drive shaft to the output shaft, in which the drive shaft and the output shaft are disposed on opposite sides of the transmission housing, to also locate both shafts on the same side of the transmission housing.

With respect to the embodiment, several configurations of the individual planetary gear sets are possible within the scope of the present invention.

Preferably at least one of the planetary gear sets is implemented as a minus planetary gear set in an individual planetary design, where several planetary gears are disposed rotatably on the carrier, and each planetary gear is constantly engaged with the sun gear and with the ring gear of the associated planetary gear set. In this case, the first element is a sun gear in at least one of the four planetary gear sets, the second element is the carrier in at least the same planetary gear set, and the third element is the ring gear in at least the same planetary gear set.

In a particularly advantageous embodiment, all four planetary gear sets are designed as minus planetary gear sets. In that case, all four planetary gear sets are designed such that the first element is the sun gear, the second element is the carrier, and the third element is the ring gear of the respective planetary gear set, wherein each planetary gear is rotatably disposed on the respective carrier, and is constantly engaged with the sun gear and with the ring gear of the associated planetary gear set.

According to another preferred embodiment, one or more of the four planetary gear sets may also be designed as a plus planetary gear set if the mutual connectivity is possible between the respectively associated elements of the planetary gear sets. In that case, the first element is the sun gear in one of the four planetary gear sets, the second element is the ring gear, and the third element is the carrier of the same planetary gear set. The carrier in a plus planetary gear set is a coupled carrier upon which inner and outer planetary gears are disposed in a rotatable manner.

A plus planetary gear set is characterized by intermeshing inner and outer planetary gears, where the inner planetary gears also mesh with the sun gear of the plus planetary gear set, and where the outer planetary gears also mesh with the ring gear of this plus planetary gear set. In the conversion of a minus planetary gear set to a plus planetary gear set, the carrier and ring gear connection are exchanged at the same time and the value of stationary transmission ratio is increased by 1, whereby the other constraints are maintained in the overall transmission are maintained.

In a further preferred embodiment, the second element of the second planetary gear set is constantly connected to the second element of the third planetary gear set. In the embodiment with only minus planetary gear sets, this means that the carrier of the second planetary gear set is constantly connected to the carrier of the third planetary gear set.

In yet another preferred embodiment, the third element of the third planetary gear set is constantly connected to the output shaft. In the embodiment with minus gear sets, the ring gear of the third planetary gear set is constantly connected to the carrier of the fourth planetary gear set and forms a part of the second shaft, which simultaneously also forms the output shaft.

Preferably, the first element of the third planetary gear set is constantly connected via the seventh shaft to the first element of the fourth planetary gear set. In the minus planetary design of the third and fourth planetary gear sets, the sun gears of the two planetary gear sets are constantly connected together so that constructively a sun gear shaft is possible for both planetary gear sets.

The fourth clutch is preferably disposed in the flow of power either between the second and eighth shafts, or between the sixth and eighth shafts, or between the seventh and eighth shafts.

Another aspect of the invention relates to the spatial arrangement of the four planetary gear sets. Preferably the first, second, third, and fourth planetary gear sets are disposed in the latter sequence in axial direction within the housing of the multi-stage transmission. The arrangement of the planetary gear sets can also vary, however, while retaining all of the same connections between the elements and the individual planetary gear sets, and the value of the stationary transmission ratio.

The spatial arrangement of the shift elements of the multi-stage transmission according to the invention within the transmission housing is, in principle, limited only by the dimensions and the outer shape of the transmission housing.

Thus, for example, it is possible according to an advantageous variant with respect to the shift element arrangement for the first, second and third clutches to be disposed, viewed spatial, in a region axially upstream of the first planetary gear set, thus on the input side of the first planetary gear set. The fourth clutch can be disposed axially in a region axially between the third and fourth planetary gear sets. The first and the second brakes, for example, may be spatially disposed axially in an area between the first and second planetary gear set. The first and the second brakes can preferably be disposed in the same axial region and radially nested in one another so that the first brake is disposed radially within the second brake. Further construction space is thereby saved, particularly in the axial direction.

In conjunction with the proposed spatial arrangement of the four planetary gear sets coaxially next to each other in the sequence "first, second, third, fourth planetary gear set", and the proposed spatial arrangement of the shift elements within the transmission housing, it is proposed that two of the four planetary gear sets are centrally penetrated by exactly two shafts, that one of the planetary sets is centrally penetrated by only one shaft, and that one of the planetary gear sets is not centrally penetrated by any shaft. "Centrally penetrated" means that a torque-transmitting shaft extends through one of the planetary gear sets, and torque is transmitted from one element upstream of the planetary gear set to an element disposed downstream of the same planetary gear set. This can either be a shaft that is not connected to the planetary set that is penetrated, which extends through the hollow sun gear shaft of the penetrated planetary gear set or the sun gear shaft of the penetrated planetary gear set itself, via which a further element disposed downstream of the penetrated planetary gear set can be driven.

Correspondingly, the structural embodiment of the pressure and lubricant supply to the servo devices of the individual shift elements is designed such that in regions of coaxially disposed shafts, lubricant is supplied via lubricant channels which are routed from a centrally disposed shaft through a hollow shaft disposed coaxially thereto, to the respective shift element, or which are routed from a part fastened to the housing, through a hollow shaft to a centrally disposed shaft and, from there, further to the respective shift element.

In the multi-stage transmission according to the invention, it is possible to optionally provide a hydrodynamic converter, an external start-up clutch, other suitable external start-up elements or an additional electric machine to start up the drive train. Preferably, however, the start-up procedure is realized using a start-up element integrated in the transmission. The first brake is especially suited for use as a start-up element that is internal to the transmission, since it is preferably transmitting torque in gear steps 1 to 3. If the drive train start-up occurs using a shift element internal to the transmission, the drive shaft of the transmission is constantly connected to the crankshaft of a drive motor in a rotationally fixed manner, or in a rotationally elastic manner.

According to a preferred embodiment with respect to the shift states of the shift elements, the first brake transmits torque in the gear steps 1 to 3, the second brake transmits torque in the gear steps 6 to 9, the first clutch transmits torque in the gear steps 1 to 7, the second clutch transmits torque in the gear steps 2, 4, 7, 8 and 9, the third clutch transmits torque in the gear steps 1, 5 and 8, and the fourth clutch transmits torque in the gear steps 3 to 6 and 9.

According to a further preferred embodiment of the invention, during a shift from one gear into the next higher or lower gear, only one of the previously engaged shift elements is disengaged and only one of the previously disengaged shift elements is engaged. In this manner it is possible to avoid group shifting, in which several shift elements must be shifted simultaneously, which is crucial for shifting quality, and simplifies shifting control.

The shift elements that are used can be designed as power shiftable clutches or brakes. In particular, force locking clutches or brakes can be used, for instance, disk clutches, band brakes, and/or cone clutches. Furthermore, form locking brakes and/or clutches such as synchronizing mechanisms or claw clutches can also be used as shift elements.

A further advantage of the multi-stage transmission presented here is that an additional drive machine, such as an electric machine, can be attached to each shaft. It is also possible to provide additional freewheels at each suitable location in the multi-staged transmission, such as between a shaft and the housing, or possibly to connect two shafts.

The following additionally applies to all example embodiments of a multi-stage transmission according to the invention presented or described above: according to the invention, different gear increments can also result from the same gear pattern depending on the stationary transmission ratio of the individual planetary gear sets, so that an application-specific variation is possible.

BRIEF DESCRIPTION OF THE DRAWINGS

The invention is described in the following in greater detail with reference to the example embodiments shown in the FIGS. 1 to 5. Components that are the same or similar are labeled using the same reference numbers.

The drawings show.

DETAILED DESCRIPTION OF THE PREFERRED EMBODIMENTS

Figure 1:
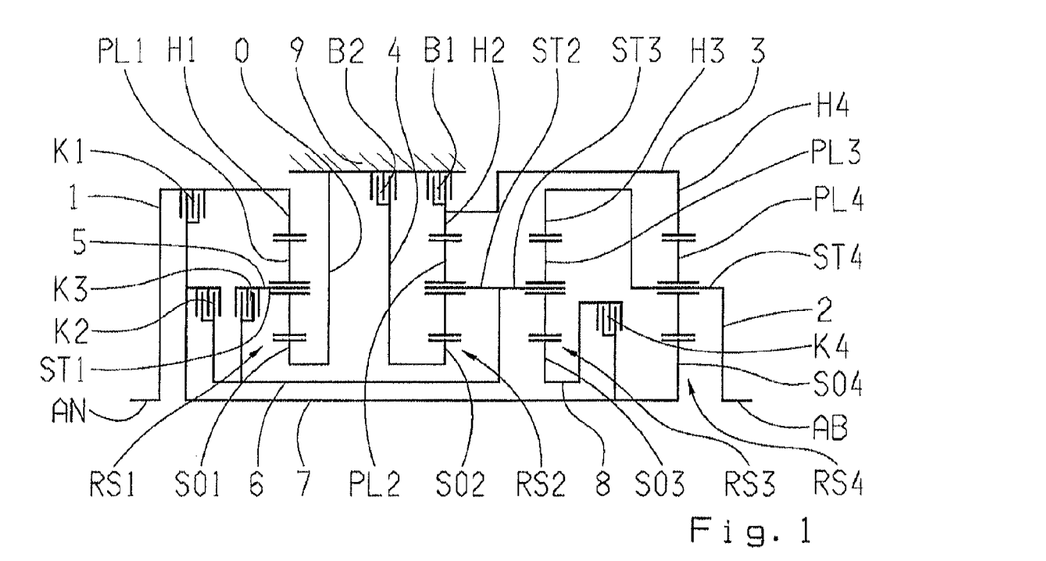
FIG. 1 a schematic representation of a first example embodiment of a multi-stage transmission according to the invention.

FIG. 1 shows a schematic representation of a shift pattern as a first example embodiment of a multi-stage transmission according to the invention. The transmission comprises a drive shaft AN and an output shaft AB, as well as four planetary gear sets RS1, RS2, RS3, RS4 and six shift elements in the form of two brakes B1, B2 and four clutches K1, K2, K3, K4, which are all disposed in a housing 9 of the transmission. The four planetary gear sets RS1, RS2, RS3, RS4 in this example embodiment are disposed in the axial direction coaxially and sequentially in the sequence "RS1, RS2, RS3, RS4".

Each of the four planetary gear sets RS1, RS2, RS3, RS4 is designed as a simple minus planetary gear set in a simple planetary design. A minus planetary gear set is known to have planet gears that mesh simultaneously with the sun and ring gear of this planetary gear set. In the schematic representation of FIG. 1, one planetary gear PL1, PL2, PL3, and PL4 is respectively represented for each of the four planetary gear sets RS1, RS2, RS3, RS4.

The ring gear of the first planetary gear set RS1 is labeled H3, the sun gear is labeled SO1, the planetary gears are labeled PL1, and the carrier on which the named planetary gears PL1 are rotatably supported, is labeled ST1. In accordance with this nomenclature, the ring gear of the second planetary gear set RS2 is labeled H2, the sun gear is labeled SO2, the planetary gears are labeled PL2, and the carrier on which the named planetary gears PL2 are rotatably supported, is labeled ST2.

The ring gear of the third planetary gear set RS is labeled H3, the sun gear is labeled SO3, the planetary gears are labeled PL3, and the carrier on which the named planetary gears PL3 are rotatably supported, is labeled ST3. Correspondingly, the ring gear of the fourth planetary gear set RS4 is labeled H4, the sun gear is labeled SO4, the planetary gears are labeled PL4, and the carrier on which the named planetary gears PL4 are rotatably supported, is labeled ST4.

Furthermore as seen in FIG. 1, the shift elements B1 and B2 are formed as brakes that, in the illustrated example embodiment, are implemented as frictionally engaged shiftable multi-disk brakes that naturally can be implemented in another embodiment also as a frictionally engaged shiftable band brake or, for example, as a form-lockably shiftable jaw-type brakes or cone brakes. The shift elements K1, K2, K3 and K4 are designed as clutches that in the illustrated example embodiment, are all designed as frictionally engaged shiftable multi-disk clutches that naturally can be implemented in another embodiment also as form-lockably shiftable claw or cone clutches. With these six shift elements B1, B2 and K1 to K4, it is possible to achieve selective shifting of up to nine gears, which will be explained below in greater detail. The multi-stage transmission according to the invention has a total of eight rotatable shafts that are labeled 1 to 8.

In the embodiment of the multi-stage transmission according to the invention according to FIG. 1, the following is provided with respect to the kinematic coupling of the individual elements of the four planetary gear sets RS1, RS2, RS3, RS4 with each other and to the drive shaft and output shaft AN, AB: the ring gear H1 of the first planetary gear set RS1 and the drive shaft AN, which both comprise a part of the first shaft 1, are constantly connected together in a rotationally fixed manner. The carrier ST1 of the first planetary gear set RS1 is part of the fifth shaft 5 and via the third clutch K3 is connected in a rotationally fixed manner to the carrier ST2 of the second planetary gear set RS2 and to the carrier ST3 of the third planetary gear set RS3. The sun gear SO1 of the first planetary gear set RS1 is constantly firmly connected to the housing 9 via a rigid connection 0.

The ring gear H2 of the second planetary gear set RS2, as third shaft 3, is constantly connected to the ring gear H4 of the fourth planetary gear set RS4. The carrier ST2 of the second planetary gear set RS2, as sixth shaft 6, is constantly connected in a rotationally fixed manner to the carrier ST3 of the third planetary gear set RS3. The sun gear SO2 of the second planetary gear set, as fourth shaft 4, is constantly connected to the second brake B2, via which the sun gear SO2 can be braked to a standstill with respect to the housing 9.

The ring gear H3 of the third planetary gear set RS3, as second shaft 2, is constantly connected to the carrier ST4 of the fourth planetary gear set RS4, and the second shaft 2 simultaneously forms the output shaft AB. The sun gear SO3 of the third planetary gear set RS3 can be connected to the sun gear SO4 of the fourth planetary gear set RS4 via the fourth clutch K4. The sun gear SO3 of the third planetary gear set RS3 and the fourth clutch K4 are connected together via the eighth shaft 8, and the shaft between the fourth clutch K4 and the sun gear SO4 of the fourth planetary gear set RS4 is the seventh shaft 7.

In the case of the multi-stage transmission according to the first solution according to the invention, the following is provided with regard to the kinematic coupling of the six shift elements B1, B2 and K1, K2, K3 and K4 to the described transmission shafts 1 to 8:

The brake B1 is disposed in the flow of power between the third shaft 3 and the housing 9 of the transmission and, in the engaged or closed state, fixes the interconnected ring gears H2 and H4 of the second and fourth planetary gear sets RS2, RS4 to the housing 9. The brake B2 is disposed in the flow of power between the fourth shaft 4 and the housing 9 of the transmission and, in the engaged or closed state, fixes the sun gear SO2 of the second planetary gear set RS2 to housing 9.

The first clutch K1 is disposed in the flow of power between the first shaft 1, in other words the drive shaft AN, and the seventh shaft 7 and in the closed state connects the drive shaft AN to the sun gear SO4 of the fourth planetary gear set RS4. The second clutch K2 is disposed in the flow of power between the sixth shaft 6 and the seventh shaft 7 when engaged or closed, connects the carriers ST2 and ST3 of the second and third planetary gear set RS2 and RS3 to the sun gear SO4 of the fourth planetary gear set RS4. The third clutch K3 is disposed in the flow of power between the fifth shaft 5 and the sixth shaft 6 when shifted or closed, connects the carrier ST1 of the first planetary gear set RS1 with the carriers ST2 and ST3 of the second and third planetary gear sets RS2 and RS3. The fourth clutch K4 is disposed in the flow of power between the seventh shaft 7 and the eighth shaft 8 and in the engaged or closed state connects the sun gear SO3 of the third planetary gear set RS3 to the sun gear SO4 of the fourth planetary gear set RS4.

In the example embodiment shown in FIG. 1, the first planetary gear set RS1 is the gear set near the drive of the transmission and the fourth planetary gear set RS4 is the gear set near the output of the transmission, wherein drive shaft AN and output shaft AB are disposed coaxially to each other, for example.

In principle, any spatial arrangement of the shift elements is possible within the transmission of the example embodiment shown in FIG. 1 of a multi-stage transmission according to the invention, and is limited only by the dimensions and the outer shape of the transmission housing 9.

In the example embodiment illustrated in FIG. 1, the brake B2, viewed spatially, is disposed in a region axially between the first planetary gear set RS1 near the drive and the adjacent second planetary gear set RS2. An inner disk carrier at the brake B2 forms a section of the fourth shaft 4 of the transmission, and is connected in a rotationally fixed manner to the sun gear SO2 of the second planetary gear set RS2.

The brake B1, viewed spatially, is disposed at least partially in a region radially above the second planetary gear set RS2. An inner disk carrier of the brake B1 forms a section of the third shaft 3 of the transmission, and is connected in a rotationally fixed manner to the ring gears H2 and H4 of the second and of the fourth planetary gear sets RS2 and RS4.

As also seen in FIG. 1, the first, the second and the third clutch K1, K2 and K3, viewed spatially, are disposed axially in an area on the drive side to the first planetary gear set RS1, i.e. upstream of the first planetary gear set RS1. The fourth clutch K4, viewed spatially, is disposed axially between the third and the fourth planetary gear sets RS3 and RS4. For clarity, the servo devices required to actuate each of the disk packets of the clutches are not shown in FIG. 1.

It is obvious to a person skilled in the art that the spatial arrangement of clutches and brakes within the transmission housing 9 can be modified fairly simply from the example embodiment shown in FIG. 1. If required, a person skilled in the art can also modify this example spatial arrangement of the four clutches K1, K2, K3 and K4 without substantially modifying the component structure of the transmission illustrated in FIG. 1.

An outer disk-carrier of the first clutch K1 forms a section of the first shaft 1 and is connected to the drive shaft AN in a rotationally fixed manner. An inner disk carrier of the first clutch K1 forms a section of the seventh shaft 7 of the transmission and is connected in a rotationally fixed manner to the sun gear SO4 of the fourth planetary gear set RS4. A servo device required to actuate the disk pack of the clutch K1 can be mounted in an axially displaceable manner at the named inner disk carrier of the first clutch K1, for example, and then rotates constantly with the rotational speed of the seventh shaft 7. It may also be designed so that the servo device of the first clutch K1 is disposed within the cylindrical space formed by the outer disk carrier of the first clutch K1 in such a way that the servo device of the first clutch K1 is supported in axially displaceable manner at this outer disk carrier of the first clutch K1, and rotates constantly with the rotational speed of the first shaft 1. In order to compensate for the rotary pressure of its rotating pressure space, each servo device of clutches K1, K2, K3 and K4 can have dynamic pressure equalization in a known manner.

An outer disk carrier of the second clutch K2 forms a section of the seventh shaft 7 of the transmission, and is connected in a rotationally fixed manner to the inner disk carrier of the first clutch K1, and is connected to the sun gear SO4 of the fourth planetary gear set RS4. An inner disk carrier of the second clutch K2 forms a section of the sixth shaft 6 of the transmission and is connected in a rotationally fixed manner to the carriers ST2 and ST3 of the second and third planetary gear sets RS2 and RS3. A servo device required to actuate the disk pack of the second clutch K2 can be mounted in an axially displaceable manner on the named inner disk carrier of the second clutch K2, for example, and then constantly rotates at the rotational speed of the sixth shaft 6. It can also be provided, however, that the servo device of the second clutch K2 is disposed within the cylindrical space formed by the outer disk carrier of the second clutch K2, so that the servo device of the second clutch K2 is mounted in an axially displaceable manner on this outer disk carrier, and rotates constantly with the rotational speed of the seventh shaft 7.

An outer disk carrier of the third clutch K3 forms a section of the fifth shaft 5 of the transmission and is connected in a rotationally fixed manner to the carrier ST1 of the first planetary gear set RS1. An inner disk carrier of the third clutch K3 forms a section of the sixth shaft 6 of the transmission and is connected in a rotationally fixed manner to the carriers ST2 and ST3 of the second and third planetary gear sets RS2 and RS3. A servo device required to actuate needed to operate the disk pack of the third clutch K3 can be mounted in an axially displaceable manner on the named inner disk carrier of the third clutch K3, for example, and then rotates constantly with the rotational speed of the sixth shaft 6. It can also be provided that the servo device of the third clutch K3 is disposed within the cylindrical space formed by the outer disk carrier of the third clutch K3 so that the servo device of the third clutch K3 is mounted in an axially displaceable manner at this outer disk carrier and rotates constantly with the rotational speed of the fifth shaft 5.

An outer disk carrier of the fourth clutch K4 forms a section of the eighth shaft 8 of the transmission and connected in a rotationally fixed manner to the sun gear SO3 of the third planetary gear set RS3. An inner disk carrier of the fourth clutch K4 forms a section of the seventh shaft 7 of the transmission and is connected in a rotationally fixed manner to the sun gear SO4 of the fourth planetary gear set RS4. A servo device required to actuate the disk pack of the fourth clutch K4 can be mounted in an axially displaceable manner on the named inner disk carrier of the fourth clutch K4, for example, and constantly rotates with the rotational speed of the seventh shaft 7. It can also be provided that the servo device of the fourth clutch K4 is disposed within the cylindrical space formed by the outer disk carrier of the fourth clutch K4 so that the servo device of the fourth clutch K4 is mounted in an axially displaceable manner on this outer disk carrier, and rotates constantly with the rotational speed of the eighth shaft 8.

Figure 2:
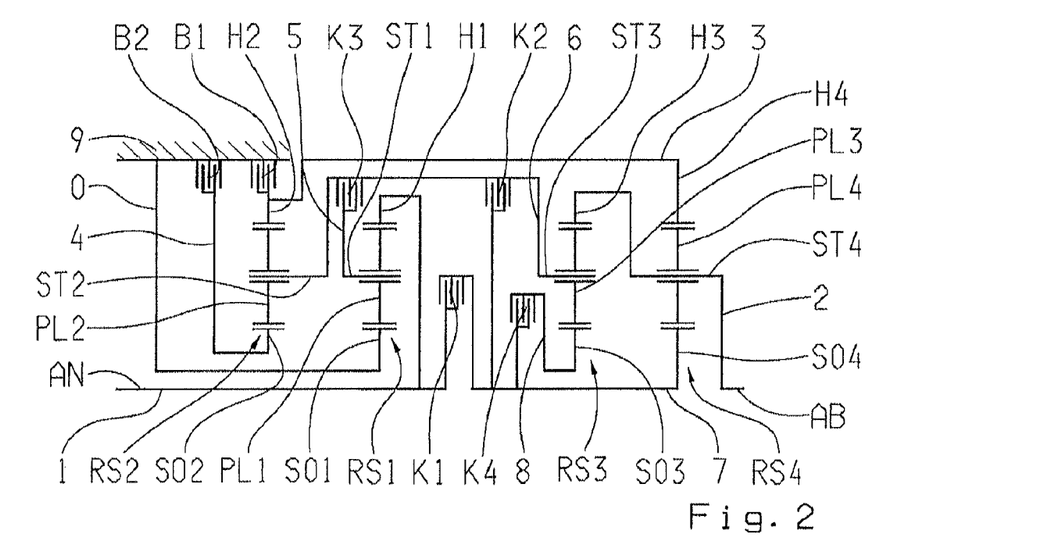
FIG. 2 a schematic representation of a second example embodiment of a multi-stage transmission according to the invention.

The arrangement of the planetary gear sets can be varied. Thus FIG. 2 shows an arrangement in which, in comparison to the transmission in FIG. 1, the first planetary gear set RS1 is merely exchanged with the second planetary gear set RS2 in the spatial arrangement. All connections between the elements of the planetary gear sets, the shift elements, the shafts and the housing remain the same as in FIG. 1. Likewise, the values of the stationary transmission ratios of the individual planetary gear sets and therefore the values of the transmission ratio according to FIG. 1 are the same as for the transmission according to FIG. 2. Thus, the shift matrix from FIG. 5 can also be used for the multi-stage transmission according to FIG. 2. With the exchanged spatial arrangement of the first and of the second planetary gear sets RS1 and RS2, the spatial arrangement of the clutches is also changed. In the transmission according to FIG. 2, all three clutches K1, K2 and K4 are disposed in an axial direction between the first and the third planetary gear set RS1 or RS3, while the third clutch K3 is disposed between the first and the second planetary gear sets RS1 and RS2.

Figure 3:
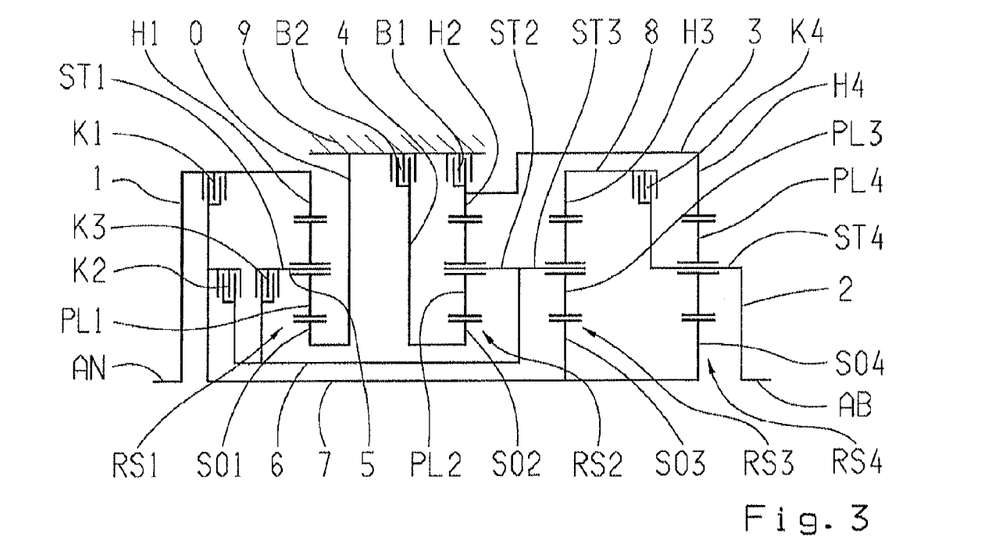
FIG. 3 a schematic representation of a third example embodiment of a multi-stage transmission according to the invention.

FIG. 3 shows a schematic of a multi-stage transmission according to a third example embodiment of the invention, which is also constructed similarly to the transmission in FIG. 1. Compared to the multi-stage transmission in FIG. 1, a rigid connection was used instead of the fourth clutch K4, wherein the sun gear SO3 of the third planetary gear set RS3, as a part of the seventh shaft 7, is constantly connected to the sun gear SO4 of the fourth planetary gear set RS4. In addition, instead of the rigic connection of the second shaft 2, a new fourth clutch K4 was placed between the ring gear H3 of the third planetary gear set RS3 and the carrier ST4 of the fourth planetary gear set RS4 so that the ring gear H3 of the third planetary gear set RS3 is now part of an eighth shaft 8 and can be connected to the carrier ST4 of the fourth planetary gear set RS4 via the fourth clutch K4, which, together with the output shaft AB, forms the second shaft 2. All additional connections between the elements of the planetary gear sets, the shift elements, the shafts and the housing remain the same as in FIG. 1. Likewise, the values of the stationary transmission ratios of the individual planetary gear sets and therefore the value of the transmission ratio is also the same in the transmission according to FIG. 3 as in the transmission according to FIG. 1. Thus, the shift matrix from FIG. 5 also applies to the multi-stage transmission according to FIG. 3.

Figure 4:
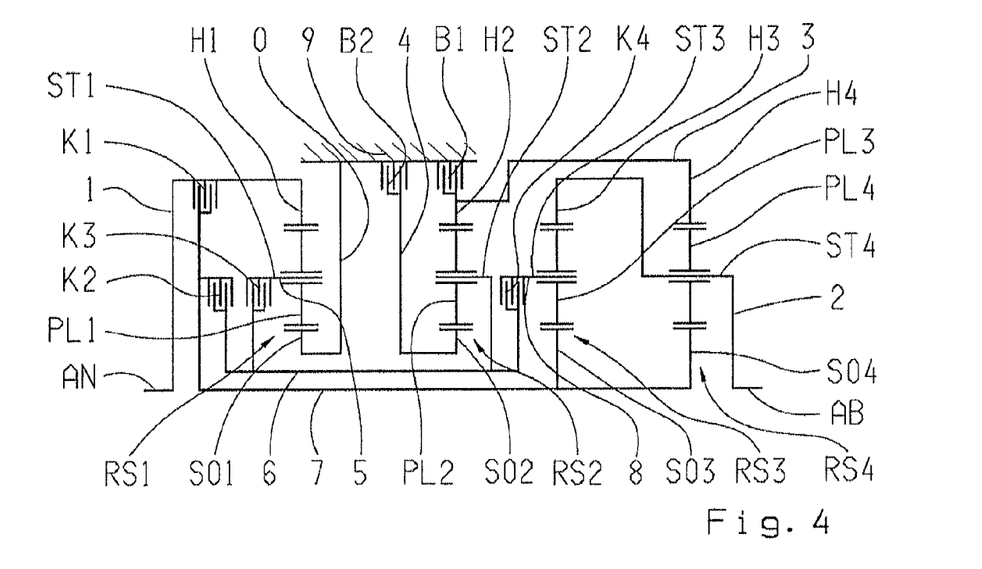
FIG. 4 a schematic representation of a fourth example embodiment of a multi-stage transmission according to the invention.

FIG. 4 shows a multi-stage transmission according to a fourth example embodiment of the invention which is also designed similarly to the transmission in FIG. 1. Compared to the multi-stage transmission in FIG. 1, instead of the fourth clutch K4, a rigid connection has been provided, whereby the sun gear SO3 of the third planetary gear set RS3 is constantly connected to the sun gear SO4 of the fourth planetary gear set RS4 as a part of the seventh shaft 7. In addition, instead of the rigid connection of the sixth shaft 6, a new fourth clutch K4 is used between the carrier ST3 of the third planetary gear set RS3 and the carrier ST2 of the second planetary gear set RS2, so that the carrier ST3 of the third planetary gear set RS3 is now a part of the eighth shaft 8 and can be connected to the carrier ST2 of the second planetary gear set RS2 via the fourth clutch K4. The carrier ST2 of the second planetary gear set RS2 remains part of the sixth shaft 6. All additional connections between the elements of the planetary gear sets, the shift elements, the shafts and the housing are the same as in FIG. 1. Likewise, the value of the stationary transmission ratios of the individual planetary gear sets and, therefore, the values of the transmission ratio for the transmission according to FIG. 1 are the same as for the transmission according to FIG. 4. Thus the shift matrix in FIG. 5 also applies to the multi-stage transmission according to FIG. 4.

Figure 5:
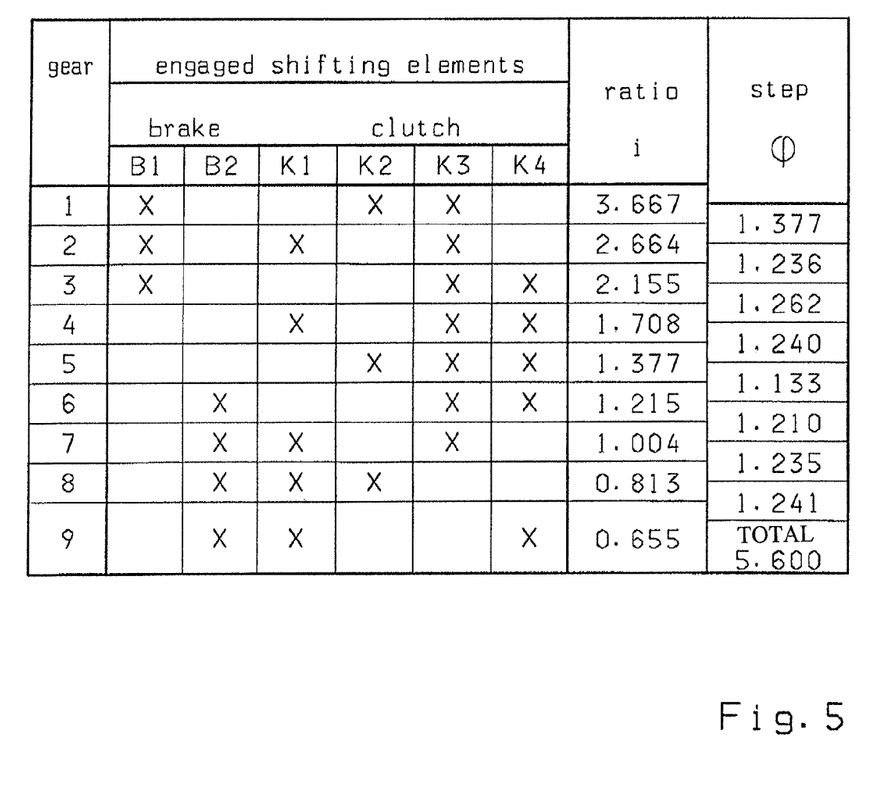
FIG. 5 an example shift pattern and example gear ratios for a multi-stage transmission according to any of FIGS. 1 to 4.

FIG. 5 shows an example shift matrix that can be provided for the multi-stage transmission according to the invention according to FIG. 1, FIG. 2, FIG. 3, and FIG. 4. In each gear, three shift elements are engaged and three shift elements are disengaged. In addition to the shift logic, exemplary values for the respective transmission ratios i of the individual gear steps and step changes φ to be determined therefrom, can also be obtained from the shift matrix.

Furthermore, the shift matrix shows that double shifts or group shifts are prevented when shifting sequentially, because two adjacent gear steps in the shift logic jointly use two shift elements.

In principle, the values of the stationary transmission ratios of the individual planetary gears set and, therefore, the values of the transmission ratios are freely selectable. The transmission ratios i listed in FIG. 5 result from the following (typical) stationary transmission ratios of the four planetary sets:

RS1: minus 2.655 if implemented as a minus planetary gear set,
RS2: minus 2.718 if implemented as a minus planetary gear set,
RS3: minus 1.943 if implemented as a minus planetary gear set and
RS4: minus 1.664 if implemented as a minus planetary gear set

REFERENCE CHARACTERS 0 connection
1 first shaft
2 second shaft
3 third shaft
4 fourth shaft
5 fifth shaft
6 sixth shaft
7 seventh shaft
8 eighth shaft
9 transmission housing
AN drive shaft
AB driven shaft B1 first brake
B2 second brake
K1 first clutch
K2 second clutch
K3 third clutch
K4 fourth clutch
RS1 first planetary gear set
RS2 second planetary gear set
RS3 third planetary gear set
RS4 fourth planetary gear set
PL1 planet gear of the first planetary gear set
PL2 planet gear of the second planetary gear set
PL3 planet gear of the third planetary gear set
PL4 planet gear of the fourth planetary gear set
SO1 sun gear of the first planetary gear set
SO2 sun gear of the second planetary gear set
SO3 sun gear of the third planetary gear set
SO4 sun gear of the fourth planetary gear set
ST1 carrier of the first planetary gear set
ST2 carrier of the second planetary gear set
ST3 carrier of the third planetary gear set
ST4 carrier of the fourth planetary gear set
H1 ring gear of the first planetary gear set
H2 ring gear of the second planetary gear set
H3 ring gear of the third planetary gear set
H4 ring gear of the fourth planetary gear set

The invention claimed is:
1. A multi-stage transmission comprising:
a housing (9);
a drive shaft (AN);
an output shaft (AB);
first, second, third and fourth planetary gear sets (RS1, RS2, RS3, RS4), each of the first, the second, the third and the fourth planetary gear sets (RS1, RS2, RS3, RS4) comprising a first element, a second element and a third element;
at least first, second, third, fourth, fifth, sixth, seventh and eighth rotatable shafts (1, 2, 3, 4, 5, 6, 7, 8)
six shift elements comprising first, second, third and fourth clutches (K1, K2, K3, K4) and first and second brakes (B1, B2), and selective engagement of the first clutch (K1), the second clutch (K2), the third clutch (K3), the fourth clutch (K4), the first brake (B1) and the second brake (B2) results in different transmission ratios between the drive shaft (AN) and the output shaft (AB) such that up to nine forward gears can be implemented;
wherein, the drive shaft (AN) is coupled to the third element (H1) of the first planetary gear set (RS1) and forms the first shaft (1);
the first element (SO1) of the first planetary gear set (RS1) is rotationally fixed to the housing;
the second element (ST1) of the first planetary gear set (RS1) forms at least a portion of the fifth shaft (5) and is connectable to the second element (ST2) of the second planetary gear set (RS2);
the first element (SO2) of the second planetary gear set (RS2) forms at least a portion of the fourth shaft (4) and is connectable to the housing via the second brake (B2);
the third element (H2) of the second planetary gear set (RS2) forms at least a portion of the third shaft (3) and is connectable to the housing via the first brake (B1);
the third element (H2) of the second planetary gear set (RS2) is coupled, via the third shaft (3), to the third element (H4) of the fourth planetary gear set (RS4);
the first element (SO4) of the fourth planetary gear set (RS4) forms at least a portion of the seventh shaft (7) and is connectable to the drive shaft (AN) via the first clutch (K1),
the second element (ST4) of the fourth planetary gear set (RS4) forms at least a portion of the second shaft (2) and is coupled to the output shaft (AB); and
exactly three of the first clutch (K1), the second clutch (K2), the third clutch (K3), the fourth clutch (K4), the first brake (B1) and the second brake (B2) are engaged for each of the up to nine forward gears to be implemented.

2. The multi-stage transmission according to claim 1, wherein
the first element of at least one of the first planetary gear set (RS1), the second planetary gear set (RS2), the third planetary gear set (RS3) and the fourth planetary gear set (RS4) is a sun gear;
the second element of the at least one of the first planetary gear set (RS1), the second planetary gear set (RS2), the third planetary gear set (RS3) and the fourth planetary gear set (RS4) is a carrier; and
the third element of the at least one of the first planetary gear set (RS1), the second planetary gear set (RS2), the third planetary gear set (RS3) and the fourth planetary gear set (RS4) is a ring gear; and
at least one of the first planetary gear set (RS1), the second planetary gear set (RS2), the third planetary gear set (RS3) and the fourth planetary gear set (RS4) is a minus planetary gear set.

3. The multi-stage transmission according to claim 2, wherein
the first element of each of the first planetary gear set (RS1), the second planetary gear set (RS2), the third planetary gear set (RS3) and the fourth planetary gear set (RS4) is a sun gear;
the second element of each of the first planetary gear set (RS1), the second planetary gear set (RS2), the third planetary gear set (RS3) and the fourth planetary gear set (RS4) is a carrier; and
the third element of each of the first planetary gear set (RS1), the second planetary gear set (RS2), the third planetary gear set (RS3) and the fourth planetary gear set (RS4) is a ring gear; and
each of the first planetary gear set (RS1), the second planetary gear set (RS2), the third planetary gear set (RS3) and the fourth planetary gear set (RS4) is a minus planetary gear set.

4. The multi-stage transmission according to claim 1, wherein
the first element of at least one of the first planetary gear set (RS1), the second planetary gear set (RS2), the third planetary gear set (RS3) and the fourth planetary gear set (RS4) is a sun gear;
the second element of the at least one of the first planetary gear set (RS1), the second planetary gear set (RS2), the third planetary gear set (RS3) and the fourth planetary gear set (RS4) is a ring gear;
the third element of the at least one of the first planetary gear set (RS1), the second planetary gear set (RS2), the third planetary gear set (RS3) and the fourth planetary gear set (RS4) is a carrier; and
at least one of the first planetary gear set (RS1), the second planetary gear set (RS2), the third planetary gear set (RS3) and the fourth planetary gear set (RS4) is a plus planetary gear set.

5. The multi-stage transmission according to claim 1, wherein the second element (ST2) of the second planetary gear set (RS2) is coupled to the second element (ST3) of the third planetary gear set (RS3).

6. The multi-stage transmission according to claim 1, wherein the third element (H3) of the third planetary gear set (RS3) forms at least a portion of the second shaft (2) and is coupled to the second element (ST4) of the fourth planetary gear set (RS4) and the output shaft (AB).

7. The multi-stage transmission according to claim 1, wherein the first element (SO3) of the third planetary gear set (RS3) is coupled, via the seventh shaft (7), to the first element (SO4) of the fourth planetary gear set (RS4).

8. The multi-stage transmission according to claim 1, wherein the fourth clutch (K4) is located in a flow of power between one of the second and the eighth shafts (2, 8), the sixth and the eighth shafts (6, 8) and the seventh and the eighth shafts (7, 8).

9. The multi-stage transmission according to claim 1, wherein the first planetary gear set (RS1), the second planetary gear set (RS2), the third planetary gear set (RS3) and the fourth planetary gear set (RS4) are axially arranged within the housing (9) of the multi-stage transmission and disposed in the sequence of:
the first planetary gear set (RS1), the second planetary gear set (RS2), the third planetary gear set (RS3) and the fourth planetary gear set (RS4).

10. The multi-stage transmission according to claim 1, wherein
two of the first planetary gear set (RS1), the second planetary gear set (RS2), the third planetary gear set (RS3) and the fourth planetary gear set (RS4) are centrally penetrated by exactly two of the first, the second, the third, the fourth, the fifth, the sixth, the seventh and the eighth rotatable shafts (1, 2, 3, 4, 5, 6, 7, 8);
one of the first planetary gear set (RS1), the second planetary gear set (RS2), the third planetary gear set (RS3) and the fourth planetary gear set (RS4) is centrally penetrated by only one of the first, the second, the third, the fourth, the fifth, the sixth, the seventh and the eighth rotatable shafts (1, 2, 3, 4, 5, 6, 7, 8); and
one of the first planetary gear set (RS1), the second planetary gear set (RS2), the third planetary gear set (RS3) and the fourth planetary gear set (RS4) is centrally penetrated by none of the first, the second, the third, the fourth, the fifth, the sixth, the seventh and the eighth rotatable shafts (1, 2, 3, 4, 5, 6, 7, 8).

11. The multi-stage transmissions according to claim 1, wherein the first brake (B1) is a start-up element and is engaged for a first forward gear, a second forward gear and a third forward gear to facilitate transmission of torque through the multi-stage transmissions.

12. The multi-stage transmissions according to claim 1, wherein
the first brake (B1) is engaged for a first forward gear, a second forward gear and a third forward gear to facilitate transmission of torque through the multi-stage transmission;
the second brake (B2) is engaged for a sixth forward gear, a seventh forward gear, an eighth forward gear and a ninth forward gear to facilitate the transmission of torque through the multi-stage transmission;
the first clutch (K1) is engaged for the second forward gear, a fourth forward gear, the seventh forward gear, the eighth forward gear and the ninth forward gear to facilitate the transmission of torque through the multi-stage transmission;
the second clutch (K2) is engaged for the first forward gear, a fifth forward gear and the eighth forward gear to facilitate the transmission of torque through the multi-stage transmission;
the third clutch (K3) is engaged for the first forward gear, the second forward gear, the third forward gear, the fourth forward gear, the fifth forward gear, the sixth forward gear and the seventh forward gear to facilitate the transmission of torque through the multi-stage transmission; and
the fourth clutch (K4) is engaged for the third forward gear, the fourth forward gear, the fifth forward gear, the sixth forward gear and the ninth forward gear to facilitate the transmission of torque through the multi-stage transmission.

13. The multi-stage transmission according to claim 1, wherein, during a shift from a current forward gear to either a next higher forward gear or a next lower forward gear, only one of the six shift elements (B1, B2, B3, K1, K2, K3) that is disengaged, for the current forward gear, is engaged, and only one of the six shift elements (B1, B2, B3, K1, K2, K3) that is engaged, for the current forward gear, is disengaged.

* * * * *